United States Patent
Chowdhury et al.

(10) Patent No.: US 7,460,515 B1
(45) Date of Patent: Dec. 2, 2008

(54) ACCESS CONTROL BY CALL TYPE

(75) Inventors: Kuntal Chowdhury, Plano, TX (US); Yasaman Abtahi, Orleans (CN); Chung-Ching Wang, Plano, TX (US); Mini Vasudevan, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 868 days.

(21) Appl. No.: 10/143,229

(22) Filed: May 10, 2002

Related U.S. Application Data

(60) Provisional application No. 60/311,464, filed on Aug. 10, 2001.

(51) Int. Cl.
  *H04L 12/66* (2006.01)
  *H04Q 7/20* (2006.01)
(52) U.S. Cl. .................................. 370/349; 455/453
(58) Field of Classification Search .................. None
  See application file for complete search history.

(56) References Cited

U.S. PATENT DOCUMENTS

| | | | | |
|---|---|---|---|---|
| 5,970,412 | A * | 10/1999 | Maxemchuk | 455/447 |
| 6,243,449 | B1 * | 6/2001 | Margulis et al. | 379/112.04 |
| 6,842,619 | B2 * | 1/2005 | Lee et al. | 455/453 |
| 6,876,857 | B1 * | 4/2005 | Nee et al. | 455/450 |
| 6,925,059 | B2 * | 8/2005 | Feli et al. | 370/235 |
| 6,950,656 | B1 * | 9/2005 | Bahk et al. | 455/436 |
| 6,985,464 | B2 * | 1/2006 | Harper et al. | 370/331 |
| 7,092,727 | B1 * | 8/2006 | Li et al. | 455/466 |
| 2001/0031634 | A1 * | 10/2001 | Mizutani et al. | 455/425 |
| 2001/0038616 | A1 * | 11/2001 | Fong et al. | 370/329 |
| 2002/0055364 | A1 * | 5/2002 | Wang et al. | 455/466 |
| 2002/0160812 | A1 * | 10/2002 | Moshiri-Tafreshi et al. | 455/561 |
| 2002/0173316 | A1 * | 11/2002 | Jang et al. | 455/453 |
| 2005/0025116 | A1 * | 2/2005 | Chen et al. | 370/349 |

* cited by examiner

*Primary Examiner*—Firmin Backer
*Assistant Examiner*—Clemence Han
(74) *Attorney, Agent, or Firm*—Garlick Harrison & Markison; James A. Harrison

(57) ABSTRACT

A packet data service node (PDSN) is formed to establish a connection with a plurality of mobile terminals by way of one or more packet control function cards or devices. A packet control function (PCF) card or device is formed to provide an interface between the packet data domain and wireless domain and further to inform a base station controller/access network controller (BSC/ANC) to block the setup and establishment of any additional communication links in a specified manner until the overload condition ceases to exist. More specifically, the PCF receives loading information from each PDSN to which it is connected and determines a composite loading factor. The PCF transmits the composite loading factor to the BSC/ANC periodically or if the loading factor exceeds a specified threshold and call blocking should be initiated for packet data calls for a select group of mobile terminals.

21 Claims, 6 Drawing Sheets

| MSID | GROUP | BLOCK GROUP |
|---|---|---|
| nnn1 | 1 | A |
| nnn4 | 4 | B |
| nnn7 | 7 | D |
| nnn1 | 1 | A |
| nnn2 | 2 | A |
| nnn5 | 5 | C |
| nnn3 | 3 | B |
| nnn6 | 6 | C |
| nnn8 | 8 | D |
| nnn0 | 0 | E |
| nnn9 | 9 | E |

FIG. 3

ACCESS CONTROL BY CALL TYPE

CROSS REFERENCE TO RELATED APPLICATION

This application is related to, incorporates by reference and claims priority to Provisional Application for patent having a title of METHOD FOR OVERLOAD PREVENTION IN WIRELESS PACKET DATA NETWORKS and having a Ser. No. 60/311,464 and a filing date of Aug. 10, 2001.

BACKGROUND

1. Field of the Invention

The present invention relates to mobile communication devices and, more particularly, the present invention relates to mobile terminals capable of communicating in a data-only mode with a data network, as well as mobile terminals capable of communicating in voice and data modes.

2. Related Art

Wireless communication service providers, as well as Internet service providers, face some difficult challenges as the various networks are increasingly modified to work together to provide seamless end-to-end call connectivity across the various platforms. Ever-increasing residential dial-up subscribers demand available modem (or ISDN) ports, or threaten to take their business elsewhere. To meet this demand, Internet service providers are deploying a large number of complex, port-dense network access servers (NAS) to handle thousands of individual dial-up connections. As such, small and large, as well as private and public, wireless data networks are being created to seamlessly interact with large wire line networks to enable users to establish point-to-point connections independent of terminal type and location. Traditionally, however, voice networks have paved the way for the creation of data networks as users loaded the voice networks trying to transmit data, including streaming data (video and voice). Initially, traditional Public Switched Telephone Networks (PSTNs) were used for data transmissions but have been largely supplanted by packet data networks, including various versions of the "Internet".

The wireless domain has had a parallel history. Initial voice networks, including the Advanced Mobile Phone Service (AMPS), Time Division Multiple Access (TDMA) including North American TDMA and Global System for Mobile Communications (GSM), were used to conduct data in a limited capacity. These networks are being replaced, however, by newer wireless data-only networks, as well as data and voice networks.

The structure and operation of wireless communication systems are generally known. Examples of such wireless communication systems include cellular systems and wireless local area networks, among others. Equipment that is deployed in these communication systems is typically built to support standardized operations, i.e., operating standards. These operating standards prescribe particular carrier frequencies, modulation types, baud rates, physical layer frame structures, MAC layer operations, link layer operations, etc. By complying with these operating standards, equipment interoperability is achieved.

In a cellular system, a regulatory body typically licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscriber units within the service area. Typically, these channels are equally spaced across the licensed spectrum. The separation between adjacent carriers is defined by the operating standards and is selected to maximize the capacity supported within the licensed spectrum without excessive interference. In most cases, severe limitations are placed upon the amount of co-channel and adjacent channel interference that may be caused by transmissions on a particular channel.

In cellular systems, a plurality of base stations is distributed across the service area. Each base station services wireless communications within a respective cell. Each cell may be further subdivided into a plurality of sectors. In many cellular systems, e.g., GSM cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most, if not all, cellular systems, carrier frequencies are reused so that interference between base stations using the same carrier frequencies is minimized and system capacity is increased. Typically, base stations using the same carrier frequencies are geographically separated so that minimal interference results.

Traditional wireless mobile networks include Mobile Station Controllers (MSCs), Base Station Controllers (BSCs) and Base Transceiver Station (BTS) systems that jointly operate to communicate with mobile stations over a wireless communication link. Examples of common networks include the GSM networks, North American TDMA networks and Code Division Multiple Access (CDMA) networks. Extensive infrastructures (e.g., ANSI-41 or MAP-based networks) exist in the cellular wireless networks for tracking mobility, distributing subscriber profiles, and authenticating physical devices.

To establish a wireless communication link in traditional wireless voice networks, an MSC communicates with a BSC to prompt the BTS (collectively "Base Station" or "BS") to generate paging signals to a specified mobile station within a defined service area typically known as a cell or sector (a cell portion). The mobile station, upon receiving the page request, responds to indicate that it is present and available to accept an incoming call. Thereafter, the BS, upon receiving a page response from the mobile station, communicates with the MSC to advise it of the same. The call is then routed through the BS to the mobile station as the call setup is completed and the communication link is created. Alternatively, to establish a call, a mobile station generates call setup signals that are processed by various network elements in a synchronized manner to authenticate the user as a part of placing the call. The authentication process includes, for example, communicating with a Home Location Register (HLR) to obtain user and terminal profile information.

The next generation of cellular networks presently being developed are being modified from traditional systems to create the ability for mobile stations to receive and transmit data in a manner that provides greatly increased throughput rates. For example, many new mobile stations, often referred to as mobile terminals or access terminals, are being developed to enable a user to surf the web or send and receive e-mail messages through the wireless mobile terminal, as well as to be able to receive continuous bit rate data, including so called "streaming data". Accordingly, different systems and networks are being developed to expand such capabilities and to improve their operational characteristics.

One example of a system that is presently being deployed with voice and data capabilities is the cdma2000 network. The cdma2000 network, however, is developed from the IS-95 networks that were optimized for voice transmissions and therefore is not optimized for transmitting data even though its data transport capability is significantly improved from prior art networks and systems. More formally, the 1xRTT standard defines CDMA operation for data transmissions.

One data-only network that is being developed is defined by the 1xEVDO standard. The 1xEVDO standard defines a time burst system utilizing a 1.25 MHz carrier that is set at a carrier frequency that is adjacent to the frequencies used by the voice networks. In one particular network, a 1.67 millisecond (mS) burst is used for the forward link in a 1xEVDO network. Typical 1xEVDO networks include a Packet Data Service Node (PDSN) for performing routing and switching for a data packet or data packet stream, an Access Network Controller (ANC) that establishes and manages the wireless communication link with the mobile terminal, and a Packet Control Function (PCF) that is largely an interface device for converting signals between the packet domain and a wireless network that will be used for the communication link.

The 1xEVDO network is optimized for forward link data applications. The next generation of 1xRTT networks that are being deployed can communicate with voice and data networks but do not process data as efficiently as the networks formed according to the 1xEVDO standard. Newer networks are also being designed and have evolved from the 1xEVDO standard, including 1xEVDV, which is for transmitting data as well as voice.

The 1xEVDO networks that have been previously described are not formed, however, to interact seamlessly between the voice and data networks. For example, the 1xEVDO networks do not have or fully utilize Signaling System Number 7 (SS7) type network components to assist with call setup, user and mobile station authentication, call routing, and feature delivery. The 1xEVDO networks are formed to carry data only and do not include the full functionality and capabilities of wireless voice networks. The infrastructure of the 1xEVDO network is different and simpler than SS7-based voice networks (wire line or wireless).

One problem with present 1xEVDO and 1xRTT networks is that a PDSN may become overloaded. Current designs do not, however, provide an efficient manner to respond to overload conditions for a PDSN. There exists a need, therefore, to a system and method of responding to a situation in which a PDSN is overloaded that is efficient and reduces the consumption of network resources due to an overloaded PDSN.

SUMMARY OF THE INVENTION

A Packet Data Service Node (PDSN) is formed to establish packet data connections with a plurality of mobile terminals by way of one or more packet control function cards or devices and to provide loading information to a packet control function (PCF) card or device. The PCF is formed to provide and interface between the packet data domain and wireless domain and further to inform one of a base station controller or access network controller to block the setup and establishment of any additional communication links in a specified manner until the overload condition ceases to exist. More specifically, the PCF receives loading information from each PDSN to which it is connected and determines a composite loading factor. In one embodiment of the invention, the PCF only transmits the composite loading factor to the BSC or ANC to which it is connected ("BSC/ANC") if the loading factor exceeds a specified threshold and call blocking should be initiated for packet data calls for a select group of mobile terminals. In such case, the BSC/ANCs that receive the composite loading factor will initiate the call blocking for packet data calls for the select group of mobile terminals. In another embodiment of the invention, the PCF periodically generates and transmits the composite loading factor to the BSC/ANCs to which it is connected. In this embodiment, the BSC/ANCs compare the received composite loading factor and compare it to specified thresholds stored within to determine whether to initiate call blocking for the specified group of mobile terminals. Other features and advantages of the present invention will become apparent from the following detailed description of the invention made with reference to the accompanying drawings. The mobile terminals are grouped according to their mobile terminal ID. The groups of mobile terminals are then selected for call blocking in a round robin manner. In one embodiment of the invention, the mobile terminals are grouped according to the last digit of the mobile terminal ID. In another embodiment, they are grouped according to the last four digits of their mobile terminal ID.

BRIEF DESCRIPTION OF THE DRAWINGS

A better understanding of the present invention can be obtained when the following detailed description of the preferred embodiment is considered with the following drawings, in which:

FIG. 3 is a signal sequence diagram that illustrates an embodiment of the present invention;

DETAILED DESCRIPTION OF THE DRAWINGS

Figure 1:
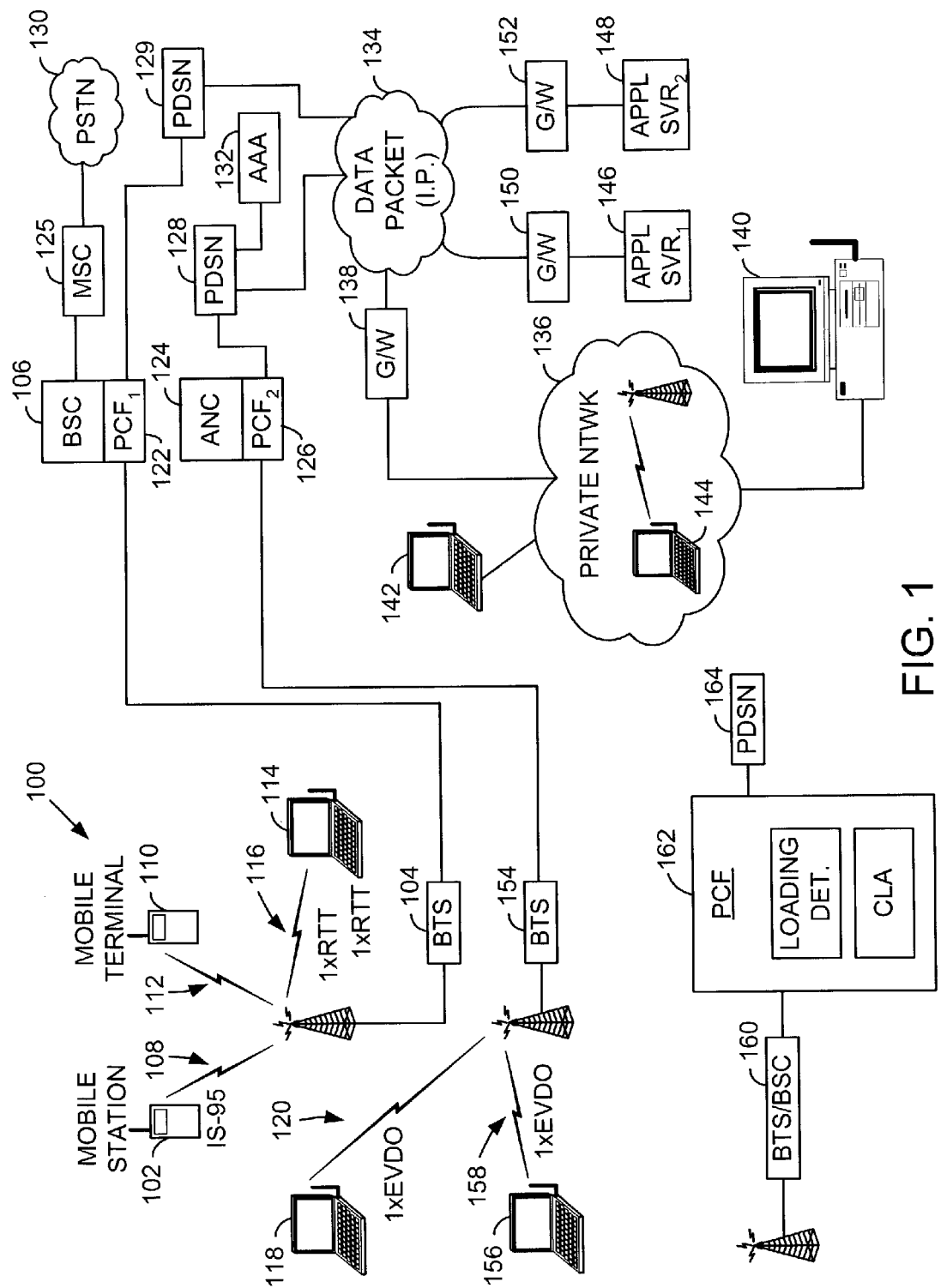
FIG. 1 is a functional block diagram of a communication network formed according to one embodiment of the present invention.

FIG. 1 is a functional block diagram of a communication network formed according to one embodiment of the present invention. As may be seen, a communication network 100 includes many networks that are coupled to operatively communicate with each other to enable a user in one type of network to communicate with a user in a different type of network. For example, the communication network 100 creates an ability for a wire line user terminal coupled to a private network to communicate with a mobile terminal through a wireless communication link. Such transparent operation with respect to the user is improving access to information and the ability for individuals to communicate to a level that is unprecedented. As discussed before, existing wireless networks have, heretofore, been adapted primarily for carrying voice calls. Accordingly, when used in conjunction with a computer terminal, the wireless voice networks were able to transmit or receive data at rates that today are viewed as unacceptably slow although they were appreciated at the outset.

Along these lines, a mobile station 102 is located within a geographic area served by a Base Transceiver Station (BTS) 104 that is coupled to a Base Station Controller (BSC) 106. More specifically, mobile station 102 communicates with BTS 104 by way of an IS-95 CDMA wireless communication network link shown generally at 108. Similarly, a mobile terminal 110 that is capable of supporting both voice and data calls communicates with BTS 104 over a wireless communication link shown generally at 112 and establishes either voice calls or data calls under the cdma2000 1xRTT protocols. In the example herein, mobile terminal 110 is engaged in a voice call, as defined by a service option generated by a mobile terminal during call setup, and thus wireless communication link 112 is transmitting merely voice signals and associated control signaling.

Similarly, a mobile terminal 114 is engaged in a data call according to 1xRTT protocols over a wireless communication link shown generally at 116. Finally, a mobile terminal 118 is engaged in a data call over a wireless communication link, shown generally at 120, according to 1xEVDO protocols in a so called "simple-IP" or "mobile-IP" network, as those terms are understood by one of average skill in the art. In general, simple-IP and mobile-IP networks do not include control-signaling protocols that are as extensive as some existing systems. For example, simple-IP and mobile-IP networks do not include a "heartbeat" mechanism used to determine that a wireless terminal is present and in an operation mode of operation.

The 1xEVDO network of the described embodiment is a high data rate, high performance and cost effective wireless packet data solution that offers high capacity and is optimized for packet data services. It provides a peak data rate, under current technology, of 2.4 Mbps within one CDMA carrier operating at a bandwidth of 1.2 MHz. Along these lines, the 1xEVDO network is formed to support connectionless communication links in contrast to traditional connection-oriented networks, such as the PSTN, and transmits Protocol Data Units (PDUs) which comprise data packets layered in a protocol such as an IP protocol. In general, the 1xEVDO transmits the PDUs in a bursty fashion notwithstanding its underlying CDMA technology. For hybrid mobile terminals capable of supporting both voice and data calls, the 1xEVDO transmits the PDUs for the data on separate 1.25 MHz channels with respect to voice thereby achieving higher system capacity.

1xEVDO network topology is a little different from traditional wireless networks, including 1xRTT data networks. More specifically, while wireless voice networks and 1xRTT data networks all include the use of a BSC and MSC for call control and call routing, a 1xEVDO system merely communicates through the radio with ANC that in turn communicates with a packet data serving node which in turn is coupled to a packet data network such as the Internet.

Continuing to examine FIG. 1, BTS 104 is coupled to communicate with BSC 106. As is understood by one of average skill in the art, Access Network Controllers (ANCs) and Base Station Controllers (BSCs) have similar functionality. Moreover, Packet Control Function Cards can be installed either within a BSC or within an ANC according to whether the PCF is to communicate with a 1xRTT device or a 1xEVDO device, respectively. As may be seen in the network of FIG. 1, a PCF 122 is formed within a BSC 106 while a PCF 124 is formed within an ANC 126. Additionally, in one embodiment of the invention, one ANC/BSC may be formed with 1xRTT and 1xEVDO equipment therewithin to be multi-network capable. The embodiment of FIG. 1 does not show such a configuration although it is to be understood that the BSC and ANC elements may readily be combined. A PCF may also be separate. For example, BTS/BSC 160 is coupled directly to a stand alone PCF 162 that is further coupled to a PDSN 164.

Within BSC 106, according to one embodiment of the present invention, a plurality of different wireless network cards are included to facilitate communications with mobile stations and mobile terminals of differing protocols and types. For example, in the described embodiment, BSC 106 includes circuitry to communicate with mobile station 102 over IS-95 CDMA wireless communication network link as shown generally at 108. BSC 106 further includes a Packet Control Function (PCF) card 122 for communicating with mobile terminals 110 and 114 utilizing 1xRTT protocols in one described embodiment of the invention. As may be seen, PCF 122, which is for communicating with 1xRTT protocol devices, is coupled a PDSN 129. BSC 106 is coupled to an MSC 125 to establish a call as is known to one of average skill in the art. PDSN 129, however, receives the data packets from PCF 122 that are to be transmitted via a packet data networks such as the Internet or, as shown in FIG. 1, packet data network 134. A PCF 124 formed within ANC 126, however, is for communicating with 1xEVDO devices and is coupled directly to a Packet Data Serving Node (PDSN) 128. Thus, mobile terminal 118 that communicates over wireless communication link 120 according to 1xEVDO communication protocols, communicates with BTS 154 and with PCF 124 formed within ANC 126 according to one embodiment of the present invention. It is understood, of course, that PCF 124 may readily be formed as a distinct device rather than within a rack of ANC/BSC 106. Moreover, PCF 124 may communicate with mobile terminal 118 through distinct radio equipment and, thus, through a BTS other than BTS 154 as shown herein.

BSC 106, which includes PCF 122, communicates with MSC 125. MSC 125 further is coupled to a PSTN 130. Accordingly, calls routed through MSC 125 are directed either to other MSCs (not shown herein) or to external networks by way of PSTN 130. The reference to PSTN herein includes SS7 and other similar "intelligent networks" as well as older and other known telephone networks. Thus, a gateway device (not shown herein) coupled to PSTN 130, may be used to access a packet data network, such as the Internet, for any data calls transmitted according to 1xRTT protocols. 1xEVDO calls, which are processed by PCF 124, however, are forwarded through PDSN 128 upon authentication by an Authentication, Authorization and Accounting (AAA) server such as AAA server 132. As may further be seen, packet data network 134 is coupled to a private network 136 by way of a gateway device 138. Private network 136 further is coupled through traditional wire line networks to a user terminal 140 and 142. Moreover, in the described embodiment of the invention, private network 136 includes a wireless LAN formed according to 802.11b protocol standards that facilitates connection to a wireless terminal 144.

Packet data network 134 further is coupled to a plurality of application servers, such as application servers 146 and 148 by way of gateway devices 150 and 152, respectively. Continuing to refer to FIG. 1, ANC 126 further is coupled to a BTS 154, which is in communication with a mobile terminal 156 by way of a 1xEVDO communication link 158.

Any one of the 1xEVDO wireless terminals 156 or 118 may also communicate through PCF 162 and PDSN 164 whenever they travel through a geographic region that is served by BTS/BSC 160. In the described embodiment, PCF 162 is formed in a distinct device and is not formed as a card within a BSC as was the case with PCF 122 and PCF 124. As will be described in greater detail below, the present invention deals in part with the situation in which a packet data session is to be established for a mobile terminal in a group of PDSNs coupled to a PCF that have become overloaded. The PCF is formed to generate a composite loading factor that it transmits to each of the BSC/ANCs to which it is operatively coupled to prompt them to initiate call blocking for a select group of mobile terminals. As may be seen, PCF 162 includes a loading determination module and a composite load analysis (CLA) module. The loading determination module is for receiving and interpreting PDSN loading signals from a PDSN such as PDSN 164. The CLA is for determining when to send composite loading or other command signals to a BSC to initiate data call blocking for a PDSN or a group of PDSNs.

Figure 2:
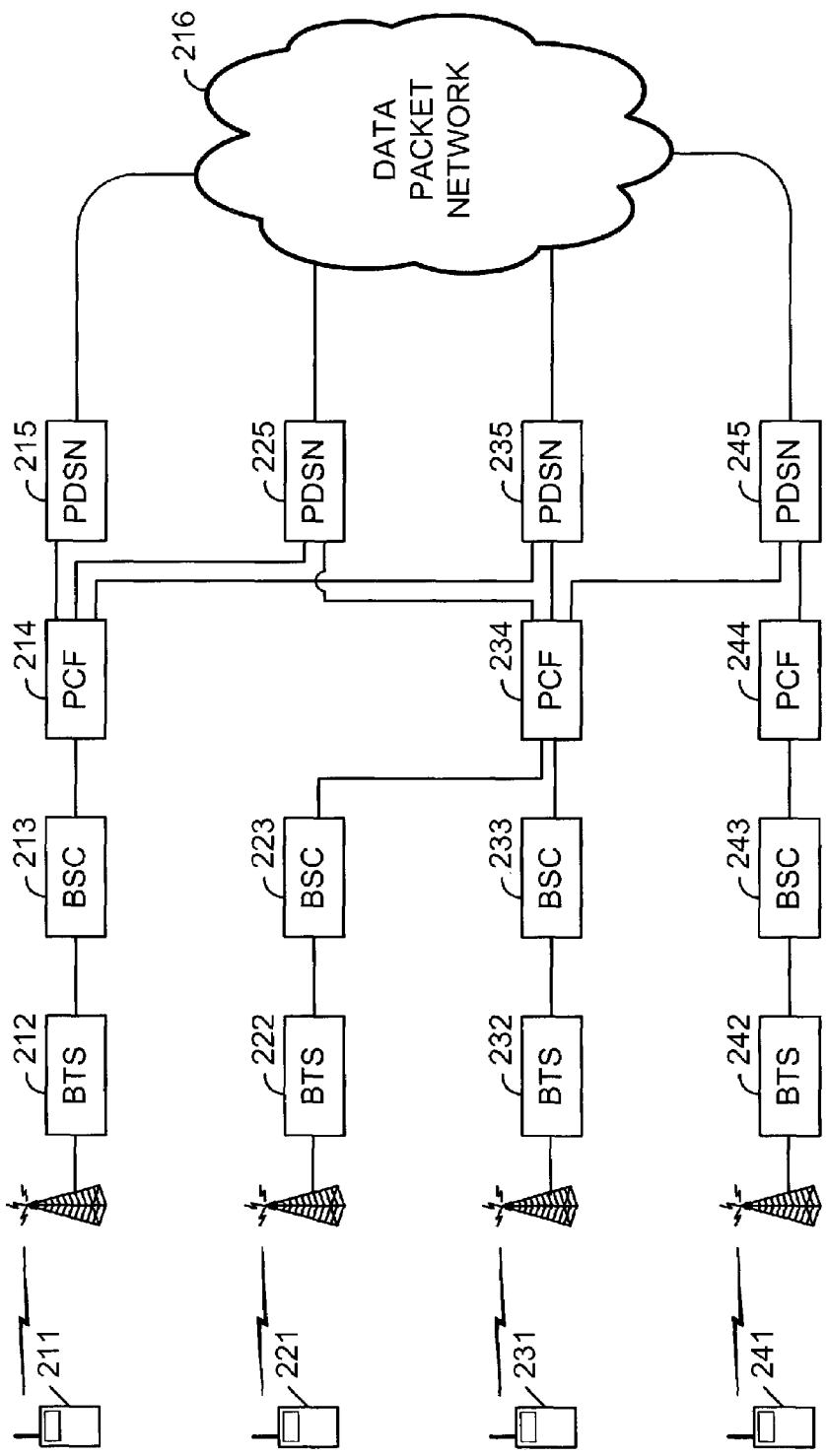
FIG. 2 is a functional block diagram that illustrates one embodiment of the present invention.

FIG. 2 is a functional block diagram that illustrates one embodiment of the present invention. In general, a plurality of mobile terminals is coupled to communicate through a plurality of wireless data sessions through a plurality of BTSs, BSC/ANCs, PCFs and PDSNs with a remote terminal by way of a packet data network. More specifically, mobile terminal 211 generates and receives radio frequency signals to and from BTS 212. BTS 212 is coupled to a BSC 213, which in turn is coupled to PCF 214. PCF 214 is further coupled to PDSNs 215, 225 and 235 which in turn are coupled to a packet data network 216.

Similarly, mobile terminal 221 generates and receives radio frequency signals to and from BTS 222. BTS 222 is coupled to a BSC 223. BSC 223 is coupled to PCF 234. PCF 234 is coupled to PDSNs 225, 235 and 245, each of which in turn is coupled to the packet data network 216.

Mobile terminal 231 generates and receives radio frequency signals to and from BTS 232. BTS 232 is coupled to a BSC 233. BSC 233, as described above, is coupled to PCF 234. Finally, mobile terminal 241 generates and receives radio frequency signals to and from BTS 242. BTS 242 is coupled to a BSC 243, which is, in turn, coupled to PCF 244. PCF 244 is further coupled to PDSN 245, which, in turn, is coupled to the packet data network 216.

As may be seen from the example of FIG. 2, any one BSC is coupled to only one PCF. Any one PCF, however, may be coupled to one or more BSCs and one or more PDSNs. Finally, any one PDSN may be coupled to one or more PCFs. As is known by one of average skill in the art, each of the PCFs include logic circuitry to select a PDSN for supporting a data session between a mobile terminal and a remote terminal coupled by way of the packet data network 216.

Generally, a PCF formed according to the present invention includes logic to monitor loading for each of the PDSNs to which it is connected and to generate control signaling to the BSC/ANCs (according to the type of device to which it is connected) to prompt the BSC/ANCs to not initiate data sessions in a prescribed manner. More specifically, a PCF, in one embodiment of the invention, receives PDSN load information for each of the PDSNs to which it is connected. If a given PDSN is loaded beyond a specified threshold, the PCF selects alternate PDSNs to which it is connected for subsequent sessions. If all of the PDSNs coupled to a given PCF become loaded to the specified threshold, the PCF generates a control signal to the BSC/ANCs to which it is connected to prompt them to initiate specified call blocking procedures. While the example of FIG. 2 illustrates operation of BSCs and PCFs, it is understood that the present invention may be practiced in different network topologies that include ANCs and other systems with ANC/BSC type functionality.

In one embodiment of the invention, a PCF determines what PDSN is to support a session that is being requested and set up according to a mobile terminal's ID (herein, "MSID"). Typically, the last four digits of a MSID are used to allocate and select a PDSN for a session as is known by one of average skill in the art. Theoretically, an approximately equal number of mobile terminals will be allocated based upon the MSID based allocation scheme for each PDSN in a given period of time. Thus, it is assumed that such a scheme will, over time, lead to even load balancing between the PDSNs. In practice, however, some PDSNs will reach a loading threshold before others though it can be expected that the others are nearly equally loaded though still below the specified threshold. As such, it is likely that, from time to time, all of the PDSNs coupled to a PCF will become loaded at the specified threshold level. Accordingly, in one embodiment of the invention, the PCF will communicate with all of the BSC/ANCs to which it is connected to initiate specified call blocking procedures.

For example, if PCF 234 receives a loading value from PDSN 235 indicating that it is loaded beyond a specified threshold, PCF 234 will prompt either PDSN 225 or 245 to support a next session that is set up if PDNS 235 is still overloaded (loaded beyond the specified threshold). If PDSNs 225 and 245 also become overloaded, however, then PCF 234 will generate control signals to BSC/ANCs 223 and 233 to initiate specified call blocking procedures.

In an alternate embodiment of the invention, each PCF, including PCF 234, merely forward PDSN loading information to each of the BSC/ANCs to which it is connected. The BSC/ANCs then determine when and to what extent call blocking procedures should be initiated. More specifically, each PCF receives a loading factor from each of the PDSNs to which it is operatively coupled. The PCF then determines a composite loading factor that it generates to the BSC/ANC. If the composite loading factor exceeds a specified threshold, and for as long as the composite loading factor exceeds the specified threshold, the BSC/ANCs receiving the composite loading factor from the PCF will initiate and perform specified call blocking procedures. The composite loading factor includes a loading factor of the PCF in one embodiment. In another embodiment, the composite loading factor merely reflects the loading of the PDSNs and not of the PCF.

In either embodiment, however, system resources are more economically used because a call set up signal to establish a packet data session received by a BSC/ANC is blocked if necessary, without wasting system resources that include forwarding to call set up request and signals to the PCF or PDSN just to have the request rejected. As is known by one of average skill in the art, a mobile terminal will typically continue to retry to establish a session if a previous session is denied. Accordingly, for a PDSN to have to continually reply to and deny session requests further adds to the overloading and further delays the time until overloading ceases. Shifting the decision to deny session requests to the BSC/ANC therefore improves network efficiencies.

FIG. 3 is a table that illustrates a method for blocking data calls according to one aspect of the invention. As may be seen, a table shown generally at 300 includes three columns 304, 308 and 312. Further, table 300 includes ten rows 316-356. Column 304 includes mobile station IDs while column 308 defines a Group and column 312 defines a Block Group. In the described embodiment, there are ten groups total but only five Block Groups A-E are defined. Thus, Groups 0 and 1 form call Block Group A, Groups 2 and 3 form call Block Group B, Groups 4 and 5 form call Block Group C, Groups 6 and 7 form call Block Group D, and Groups 8 and 9 form call Block Group E. Thus, whenever a BSC is to perform call blocking for data calls, it selects one or more call Block Groups in a round robin manner and denies call set up requests for all mobile terminals belonging to the selected call Block Groups. Whenever a mobile terminal (or other device) originates a call, the standards require it to specify in a defined service option whether the call is a data call or a voice call. Thus, if the specified service option for a call is for a voice call for a mobile terminal whose call Block Group is presently being blocked for data calls, a BSC allows the call set up to proceed through the wireless communication network because the call will not add to the workload of the PDSNs that are presently overloaded. Finally, it should be understood that mobile terminals are expected to be assigned to the ten groups in a manner that will likely result in the groups having approximately equal numbers of terminals therewithin.

Figure 4:
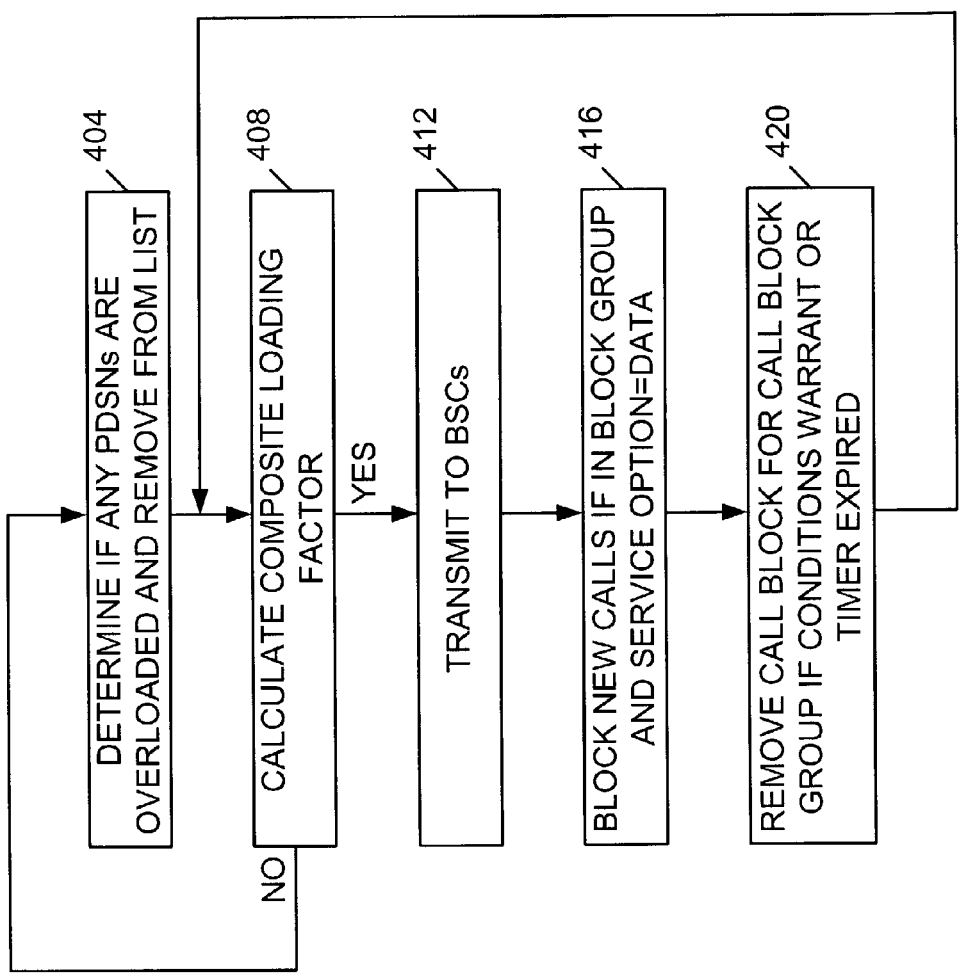
FIG. 4 is a flowchart that illustrates one method of the present invention.

FIG. 4 is a flow chart illustrating a method for blocking calls according to call type according to one embodiment of the present invention. Initially, a PCF receives a loading value from a plurality of PDSNs to which it is operatively coupled and determines if any one PDSN is overloaded and should be removed from a list of candidate PDSNs for new data sessions that are to be established (step 404). Additionally, the PCF calculates a composite loading factor that reflects the loading of all of the PDSNs to which it is coupled (step 408). In one embodiment, the composite loading factor also includes a loading value for the PCF. In an alternate embodiment, the loading value for the PCF is not included in the composite loading factor.

Once a composite loading factor has been calculated by the PCF, the composite loading factor is transmitted to the BSC (step 412). In a first embodiment of the invention, the composite loading factor is only transmitted when the composite loading factor exceeds a specified value. Accordingly, the mere transmission of the composite loading factor serves to prompt the BSC to initiate call blocking for calls whose call setup signals specify a service option that reflects that a data session is to be set up (step 416). In another embodiment of the invention, the composite loading factor is calculated and transmitted periodically. In this embodiment, the BSC must evaluate the composite loading factor to determine whether to begin call blocking for calls whose call setup signals specify a service option that reflects that a data session is to be set up.

Thereafter, the BSC begins blocking data calls until a timer value has expired or until a composite loading factor is received from the PCF indicating that call blocking for data calls is no longer necessary. Thus, the BSC stops blocking calls for the call Block Group for which it had been blocking new data calls either upon the expiration of a timer or upon receiving an indication from the PCF indicating that call blocking for data calls is not longer necessary (step 420). In the case where a timer value has expired, the BSC selects a new call Block Group for call blocking in a round robin manner thereby allowing the originally block group to request and establish data sessions.

Figure 5:
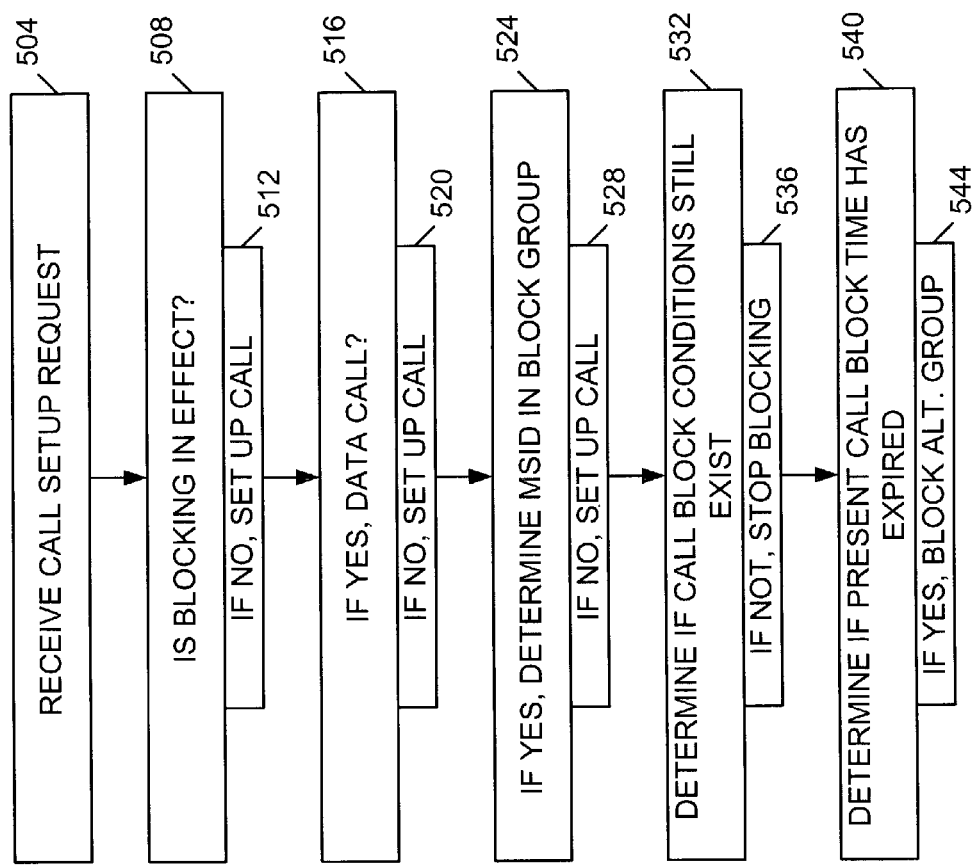
FIG. 5 is a flowchart that illustrates a second aspect of one embodiment of the present invention.

FIG. 5 is a flowchart that illustrates a second aspect of one embodiment of the present invention. Initially, a BSC receives a call setup request originated by a mobile terminal (step 504). Thereafter, the BSC determines if call blocking is in effect (step 508). If not, the BSC completes the call (packet data session) (step 512). If call blocking is in effect, the BSC analyzes the call setup signals received from the mobile terminal to see if the mobile specified in the service option field of the call set up signals that the call is a data call (step 516). If not, the BSC sets up the call (step 520).

If the call being set up is a data call as specified in the service option of the call setup signals, the BSC then determines whether the mobile terminal's ID is within a call Block Group for which calls are being blocked (step 524). If not, the BSC sets up the call (data session) (step 528). Otherwise, it blocks the call.

If call blocking is in effect, the BSC also periodically determines whether the call blocking should continue (step 532). This means that the BSC determines if a composite loading factor received from a PCF indicates that a particular group of PDSNs are still loaded beyond a threshold value. If the composite loading factor last received from the PCF that originally indicated that PDSN loading was too high for the group of PDSNs is below (has transitioned below the threshold), the BSC ceases to block calls (data sessions) (step 536). If the last received composite loading factor is still above the threshold and call blocking is still to be performed, the BSC evaluates whether a call blocking timer has expired (step 540). If the timer has expired, the BSC will begin to block a different call Block Group (step 544).

Figure 6:
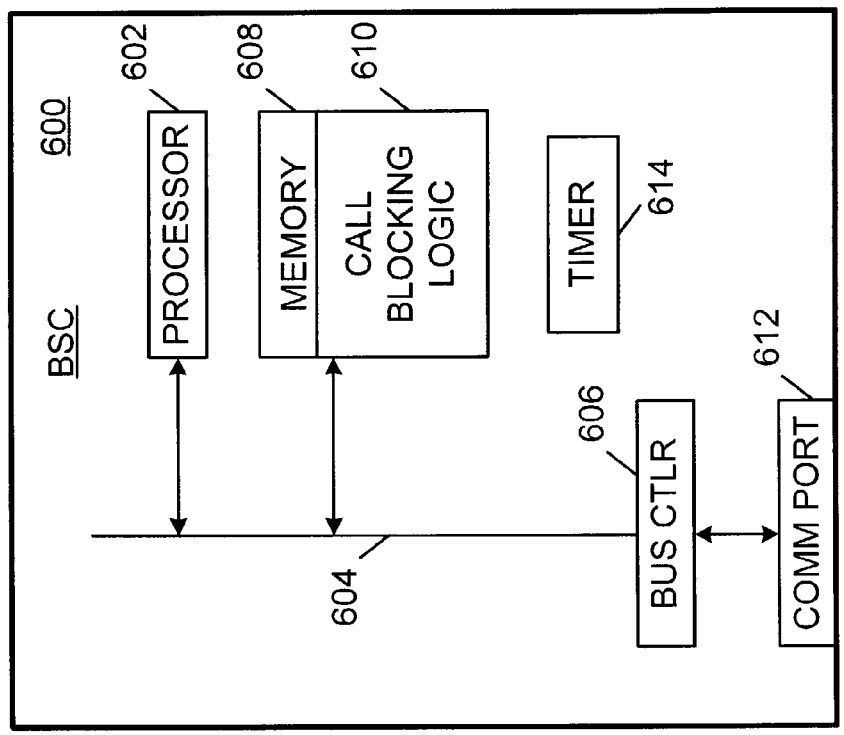
FIG. 6 is a functional block diagram that illustrates a BSC formed according to one embodiment of the invention.

FIG. 6 is a functional block diagram that illustrates a BSC formed according to one embodiment of the invention. Referring now to FIG. 6, a BSC 600 includes a processor 602 that is coupled to communicate over a bus 604. A bus controller 606 controls communications over bus 604. A memory 608 further is coupled to bus 604 and includes computer instructions that are retrieved by processor 602 over bus 604 for execution. The computer instructions within memory 608 define the operational logic of BSC 600. For example, memory 608 includes a memory portion 610 that includes computer instructions that define the BSC operational logic. Specifically, the computer instructions within memory portion 610 define logic for determining whether to block calls having a service option defining a data call, logic for determining what mobile terminals should be blocked from establishing a data session, logic for determining when to terminate call blocking (at least for a particular group of mobile terminals presently being blocked identified for call blocking). More specifically, the computer instructions within memory portion 610 define logic that is described by flowcharts and other descriptions herein of the present embodiment of the invention. As one aspect of the present invention, even within data calls, there could be several service options that define the type of data call. For example, the service option can be used to define any one of a plurality of types of data calls including Voice over IP, file transfer protocol (FTP), streaming services (continuous bit rate data), email services and other non-continuous bit rate data. Call access decisions may readily be made according to the call type specified in the service option. Moreover, the service option may further use quality of service discrimination especially in times of peak loading. Email services include any data transmission relating to or similar to email services including the delivery of any type of message. Quality of service discrimination includes allowing access based upon a class of service to which the user has subscribed. For example, during peak loading times, a lower class of service may be denied access.

Bus controller 606 further is coupled to a communication port 612 through which BSC 600 communicates with external devices. Thus, when processor 602 retrieves the computer instructions stored within memory portion 610 and executes them to determine that it should block data calls for a group of mobile terminals, processor 602 determines to not forward received call set up signals to a PCF or PDSN for which call blocking is in effect. Moreover, in one embodiment of the invention, processor 602 generates at least one signal to the mobile terminal seeking to establish a packet data session that its request is being (or has been) denied. Finally, a timer 614 is shown within BSC 600 to provide timing functionality as described herein. The implementation of a timer such as timer 614 is known to one of average skill in the art.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. For example, the methods disclosed herein may be practiced with any one of many different network topologies. Any particular hardware device formed according to the present invention may include logic that implements the process steps disclosed herein.

The invention claimed is:

1. A base station controller (BSC), comprising:
a bus coupled to a processor for transmitting computer instructions and control signals to and from the processor within the BSC;
memory coupled to the bus, the memory including computer instructions that define operational logic for causing the BSC to perform call blocking for a first select group of mobile terminals whenever a mobile terminal from the first select group generates call setup signals to establish a packet data session;
wherein the computer instructions stored within the memory define logic to prompt the processor to set a call block timer whenever call blocking is initiated for the first select group; and
a processor coupled to the bus, the processor for executing computer instructions wherein the processor retrieves the computer instructions from the memory over the bus and executes the computer instructions to block call setup signals that ordinarily would be forwarded to a packet data service node (PDSN).

2. The BSC of claim 1 wherein the computer instructions define logic to prompt the BSC to prompt the processor reset a call-blocking timer whenever call blocking is initiated for a second select group of mobile terminals.

3. The BSC of claim 2 wherein the computer instructions define logic to stop call blocking for the first select group and to initiate call blocking for the second select group upon expiration of the call blocking timer set for the first select group of mobile terminals.

4. The BSC of claim 1 wherein the computer instructions stored within the memory define operational logic to initiate call blocking whenever a call blocking command signal is received from a packet control function (PCF).

5. The BSC of claim 4 wherein the call blocking command signal comprises a composite loading factor wherein the PCF only transmits the composite loading factor whenever call blocking should be initiated.

6. The BSC of claim 1 wherein the computer instructions stored within the memory further define operational logic to evaluate whether to initiate call blocking for the first select group of mobile terminals based upon a value of composite loading factor received from a packet control function (PCF) exceeding a specified threshold.

7. The BSC of claim 6 wherein the computer instructions stored within the memory further define operational logic to stop call blocking whenever the composite loading factor received from the PCF falls below the specified threshold.

8. The BSC of claim 6 wherein the computer instructions stored within the memory further define operational logic to stop call blocking for the first select group of mobile terminals whenever a specified amount of time has elapsed since call blocking was initiated for the first select group of mobile terminals.

9. A packet control function element (PCF), comprising:
load determination module for receiving and for analyzing loading information from at least one packet data service node (PDSN); and
composite load analysis (CLA) module for generating a signal to prompt a base station controller (BSC) to initiate call blocking for data calls that are originated by a select group of mobile terminals for the at least one PDSN but to allow voice calls that are originated by the select group of mobile terminals.

10. The PCF of claim 9 wherein the signal comprises a command.

11. The PCF of claim 9 wherein the signal comprises a composite load factor that reflects PDSN loading for the at least one PDSN operatively coupled to the PCF.

12. The PCF of claim 9 wherein the CLA module includes logic for generating the signal includes logic to only generate the signal when call blocking should be initiated.

13. The PCF of claim 9 wherein the CLA module includes logic for generating the signal on a frequent basis wherein the PCF does not attempt to determine whether call blocking should be initiated and whereby the BSC receives the signal and independently determines whether to initiate call blocking for a select group of mobile terminals seeking to establish a data call.

14. A method in a base station controller (BSC) for preventing a packet data serving node (PDSN) overload in a wireless packet data network, the method comprising:
receiving, from a packet control function (PCF), a composite load factor generated by the PCF reflecting a valued based upon a load factor message the PCF received from each PDSN coupled thereto, the composite load factor reflecting that the load factor messages received by the PCF indicated that the processing load at each of the PDSNs has crossed a particular load factor threshold; and
responsive to receiving the composite load factor, blocking call set up requests for a select group of mobile terminals.

15. The method of claim 14 wherein the BSC initiates blocking of call set up requests whenever the BSC receives a composite load factor generated by the PCF.

16. The method of claim 14 wherein the BSC initiates blocking of call set up requests whenever the BSC receives a composite load factor generated by the PCF having a value that exceeds a specified threshold.

17. The method of claim 14 wherein the BSC chooses the select group of mobile terminals grouped by a specified a mobile terminal ID characteristic in a round robin manner.

18. The method of claim 14 wherein the BSC initiates a call block timer whenever call blocking is initiated for the select group wherein, if call blocking is to be continued after expiration of the call block timer, call blocking is terminated for the select group and is initiated for a second select group.

19. The method of claim 14 wherein the BSC evaluates a service option specified within a call set up signal to determine if a mobile terminal that generated the call setup signal desires to establish a packet data session.

20. The method of claim 19 wherein the packet data session defined by the service option indicates that the call being set up is one of a Voice over IP call, a file transfer protocol (FTP) call, a streaming services call which comprises a continuous bit rate data-call, or an email services call and wherein call access depends upon the call type specified in the call set up signal service option.

21. The method of claim 19 wherein the packet data session defined by the service option is used to make a quality of service discrimination in terms of deciding whether to establish the packet data session.

* * * * *